(12) United States Patent
Garreau et al.

(10) Patent No.: US 11,256,786 B2
(45) Date of Patent: Feb. 22, 2022

(54) METHOD TO SECURE A SOFTWARE CODE

(71) Applicants: THALES DIS FRANCE SA, Meudon (FR); SFNT Germany GmbH, Munich (DE)

(72) Inventors: Eric Garreau, Meudon (FR); Sébastien Volpe, Meudon (FR); Peter Garba, Munich (DE)

(73) Assignees: THALES DIS FRANCE SAS, Meudon (FR); THALES DIS CPL Deutschland GmbH, Munich (DE)

( * ) Notice: Subject to any disclaimer, the term of this patent is extended or adjusted under 35 U.S.C. 154(b) by 48 days.

(21) Appl. No.: 16/481,428

(22) PCT Filed: Jan. 25, 2018

(86) PCT No.: PCT/EP2018/051865
§ 371 (c)(1),
(2) Date: Jul. 26, 2019

(87) PCT Pub. No.: WO2018/138211
PCT Pub. Date: Aug. 2, 2018

(65) Prior Publication Data
US 2021/0133299 A1 May 6, 2021

(30) Foreign Application Priority Data
Jan. 26, 2017 (EP) .................................... 17153413

(51) Int. Cl.
*G06F 21/14* (2013.01)
*G06F 21/12* (2013.01)

(52) U.S. Cl.
CPC ............ *G06F 21/125* (2013.01); *G06F 21/14* (2013.01); *G06F 2221/0724* (2013.01); *G06F 2221/0748* (2013.01)

(58) Field of Classification Search
CPC . G06F 21/125; G06F 21/14; G06F 2221/0724
See application file for complete search history.

(56) References Cited

U.S. PATENT DOCUMENTS

2003/0188187 A1* 10/2003 Uchida ............... G06F 21/6209
726/26
2010/0115287 A1   5/2010 Betouin
(Continued)

FOREIGN PATENT DOCUMENTS

EP   2098938 A1   9/2009
EP   2937803 A1   10/2015
(Continued)

OTHER PUBLICATIONS

Anonymous: "12.2 Detecting Modification :: Chapter 12. Anti-Tampering :: C/C++ Secure Programming Programming :: eTutorials.org",, Feb. 18, 2013, XP0553557401, http://etutorials.org Retrieved from the Internet: URL:http://web.archive.org/Programming/secure+programming/Chapter+12.+Anti-Tampering/12.2+Detecting+Modification/ [retrieved on Mar. 22, 2017] the whole document.
(Continued)

*Primary Examiner* — David J Pearson
(74) *Attorney, Agent, or Firm* — The Jansson Firm; Pehr B. Jansson

(57) ABSTRACT

The present invention relates to method of securing a software code comprising at least one constant value, said method generating a secure software code and comprising the steps of: —determining (S1) by a processor in the software code a constant value to be protected, —inserting (S2) by the processor in the software code an indexed array of values such that the constant value to be protected can be determined from one value of the array, —replacing (S3) by the processor in the software code the constant value to be protected by a replacement variable, —inserting (S4) by the processor in the software code a first sequence of instruc-
(Continued)

tions which, when executed at runtime: •computes the index in the array of the value from which the constant value to be protected can be determined, •extracts from said array the value located at said computed index in said array, •from said extracted value, determines the constant value to be protected, •sets the value of said replacement variable equal to the determined constant value.

10 Claims, 3 Drawing Sheets

(56) References Cited

U.S. PATENT DOCUMENTS

| | | |
|---|---|---|
| 2013/0036473 A1 | 2/2013 | Myles et al. |
| 2013/0138973 A1* | 5/2013 | Farrugia ............... H04L 9/3013 713/190 |
| 2013/0232578 A1 | 9/2013 | Chevallier-Mames et al. |
| 2013/0347109 A1 | 12/2013 | Fluhrer |
| 2016/0344753 A1* | 11/2016 | Linderman ........... G06F 21/554 |

FOREIGN PATENT DOCUMENTS

| | | |
|---|---|---|
| EP | 3035228 A1 | 6/2016 |
| JP | 2003280754 A | 10/2003 |

OTHER PUBLICATIONS

PCT/EP2018/051866, Feb. 22, 2018, International Search Report, European Patent Office, P.B. 5818 Patentlaan 2 NL—2280 HV Rijswijk.

PCT/EP2018/051866, Feb. 22, 2018, Written Opinion of the International Searching Authority, European Patent Office, D-80298 Munich, Germany.

PCT/EP2018/051865, Mar. 7, 2018, International Search Report, European Patent Office, P.B. 5818 Patentlaan 2 NL—2280 HV Rijswijk.

PCT/EP2018/051865, Mar. 7, 2018, Written Opinion of the International Searching Authority, European Patent Office, D-80298 Munich, Germany.

* cited by examiner

METHOD TO SECURE A SOFTWARE CODE

FIELD OF THE INVENTION

The present invention relates to the field of software protection, and more particularly of anti-tampering techniques. It discloses an obfuscation method especially enabling using safely constant values in a software.

BACKGROUND OF THE INVENTION

Today, many services are provided to users by running software applications. Such applications may run on various devices, mobile or not, such as desktop computers, laptops, point of sale terminals, smartphones, etc. They may run locally or be implemented across a network like a LAN or the Internet. Some devices such as smart cards or bank credit cards may even be dedicated to running one or a few applications. Such applications are usually run in unsecured environments where an attacker may gain some control or even full control of the operation of the system running the application. Consequently, most of these applications need to implement some security mechanisms in order to protect data handled by the application from being read or modified by such an attacker.

An attacker may try to understand the operation of a software by reverse-engineering of the compiled code executed by the system. He may then access secure information handled by the software and/or modify the software in order to perform malicious operations. For example an attacker could modify a banking software in order to perform malicious financial transactions or modify a license-protected software in order to run it for free without purchasing a license. Such a reverse-engineering is usually performed using tools such as code analyzers and debuggers that extract from a compiled code information about the operation of the code such as a control flow graph describing the order of execution of instructions in the code.

In order to prevent any modification of a software code, anti-tampering techniques have been developed. They often rely on performing an integrity check on some part of the code, for example by calculating a checksum value over a specific region of the software code, and then comparing the obtained value with a known reference value. If values do not match, the code has been tampered with and the execution of the software should be prevented, either by refusing normal execution of the software or by faking it. Nevertheless, such protections can also be reversed-engineered by an attacker and broken. It is particularly easy for a debugger or code analyzer to spot the initialization of a variable to a constant value and the usage of such a constant value in a comparison performed by an anti-tampering process. This kind of information could be used by an attacker in order to identify the kind of protection being implemented in the code, which would then enable breaking the protection. For example, an attacker may identify the start and end of the region of the software on which the integrity check is performed, deduce the checksum value calculated on this region by the integrity check routine when the code is unmodified, and then patch the integrity check routine in order to always provide the valid checksum value regardless of any other modification of the software code, even in the region of the software on which the checksum value is calculated.

As a result, there is a need for a method allowing handling constant values in a software without providing an attacker analyzing the compiled code with information regarding the software operation.

SUMMARY OF THE INVENTION

For this purpose and according to a first aspect, this invention therefore relates to a method of securing a software code comprising at least one constant value, said method generating a secure software code and comprising the steps of:
determining by a processor in the software code a constant value to be protected,
inserting by the processor in the software code an indexed array of values such that the constant value to be protected can be determined from one value of the array,
replacing by the processor in the software code the constant value to be protected by a replacement variable,
inserting by the processor in the software code a first sequence of instructions which, when executed at runtime:
computes the index in the array of the value from which the constant value to be protected can be determined,
extracts from said array the value located at said computed index in said array,
from said extracted value, determines the constant value to be protected,
sets the value of said replacement variable equal to the determined constant value.

It enables to hide the constant value from an attacker, since the constant value does not appear anymore as such in the software code, while enabling at runtime to retrieve the constant value in a way that can't be easily understood and reproduced by an attacker. Consequently the secure software code is much more likely to resist at least to a static analysis of the code.

In an embodiment, the first sequence of instructions comprises a second sequence of instructions which, when executed at runtime, returns a first intermediate value, and a third sequence of instructions which, when executed at runtime, applies a first transformation function to said first intermediate value to compute said index.

Such a two-step determination of the index in the array of the value from which the constant value to be protected can be determined makes it harder for an attacker to determine by himself said index and therefore enhances the security of the method.

In an embodiment, the first transformation function is selected at random in a first set of predetermined transformation functions.

Selecting randomly the transformation function enables using different transformation functions for protecting different variables. It also makes it impossible for an attacker to predict the transformation function to use in order to retrieve the index in the array of the value from which the constant value to be protected can be determined.

In an embodiment, said value in the array from which the constant value to be protected can be determined is equal to the constant value to be protected.

It enables a fast and straightforward determination of the constant value by reading the value in the array at the index returned by the first transformation function.

The constant value to be protected may be a memory address and values in said array may be valid memory addresses when the software code is executed by a processor.

Doing so, an attacker can't recognize the constant value in the array based on the validity of the addresses in the array.

In an embodiment the first sequence of instructions includes:
- a fourth sequence of instructions which, when executed at runtime, determines a second intermediate value by applying a second transformation function to said first intermediate value,
- a fifth sequence of instructions which, when executed at runtime, determines the constant value to be protected based on the extracted value and the second intermediate value.

Such an embodiment enables to perform an indirect determination of the constant value from the values in the array. Doing so, the constant value does not appear anymore anywhere in the secure software code, not even in the array. Such a two-step determination of the constant value makes it much harder for an attacker to understand the process and to retrieve by himself the constant value.

In an embodiment, the second transformation function is selected at random in a second set of predetermined transformation functions.

Such a random selection of the second transformation function has the same advantages as the random selection of the first transformation function here above. It diversifies the process enabling to determine the index of the value from which the constant value can be retrieved and therefore makes reverse engineering more difficult.

In an embodiment, the constant value to be protected is a memory address and values in said array are invalid memory addresses when the software code is executed by a processor.

Using only invalid memory addresses in the array, an attacker can't guess which one will enable him to retrieve the constant value.

The constant value to be protected may be determined by applying a third transformation function to the extracted value and the second intermediate value. In an embodiment, the third transformation function is selected at random in a third set of predetermined transformation functions.

It makes it impossible for an attacker to determine the constant value without knowledge of the function to be used.

According to a second aspect, this invention relates to a non-transitory machine-readable storage medium encoded with instructions of a secure software code for execution by a processor, wherein:
- said secure software code is a modified version of an unsecure software code comprising a constant value to be protected,
- said constant value to be protected is replaced in the secure code by a replacement variable,
- the non-transitory machine-readable storage medium is also encoded with:
    - an indexed array of values such that said constant value to be protected can be determined from one value of the array,
    - a first sequence of instructions which, when executed at runtime:
        - computes the index in the array of the value from which said constant value to be protected can be determined,
        - extracts from said array the value located at said computed index in said array,
        - from said extracted value, determines said constant value to be protected,
        - sets the value of said replacement variable equal to said determined constant value.

According to a third aspect, this invention relates to a method of executing instructions of a secure software code for execution by a processor, wherein:
- said secure software code is a modified version of an unsecure software code comprising a constant value to be protected,
- said constant value to be protected is replaced in the secure code by a replacement variable,
- said secure software code also comprises an indexed array of values such that said constant value to be protected can be determined from one value of the array,
- said method comprising the steps of:
    - computing the index in the array of the value from which said constant value to be protected can be determined,
    - extracting from said array the value located at said computed index in said array,
    - from said extracted value, determining said constant value to be protected,
    - setting the value of said replacement variable equal to said determined constant value.

Such a non-transitory machine-readable storage medium according to the second aspect and method according to the third aspect show the same advantages as the ones of the method according to the first aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at securing a software code SC by obfuscating at least one constant value to be protected in this software code. It produces a compiled secure software code SSC such that it would be hard for an attacker to get knowledge of these constant values by analyzing the compiled secure software code with a code analyzer or a debugger.

Figure 1:
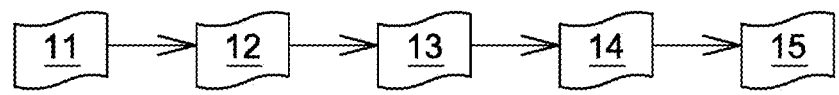
FIG. 1 illustrates the process of compiling software.

Compiling translates a source code 11, written in a high-level programming language such as C or Fortran, into an object code written in a low level language, such as machine code 15 which takes into account the hardware implementation of the system on which the code is supposed to be executed, as depicted in FIG. 1. Compiling often performs intermediate steps such as syntax analysis 12, control flow graph generation 13 and assembly code generation 14. In order to build an executable file of the compiled code, compilation is generally followed by a linking step linking together multiple files containing object code into a single executable file.

Most steps of the embodiments described hereafter may be applied to any of source code, assembly code and machine code. The following paragraphs will describe an application of the obfuscating method according to the invention to compiled code, called hereafter software code, but it shall not be interpreted as a limitation of the scope of the invention. The various arrangements that could be derived by a man skilled in the art by applying one or more of the steps of the invention to source code are included in the scope of the invention.

A first aspect of the invention is an obfuscation method for securing a software code SC comprising at least one constant value. Such a securing method is performed by a securing device 20 treating the compiled software code SC comprising computer code instructions comprising at least one constant value and producing the secure software code SSC. The obtained secure software code SSC can then be securely executed by an execution device 30.

Figure 2:
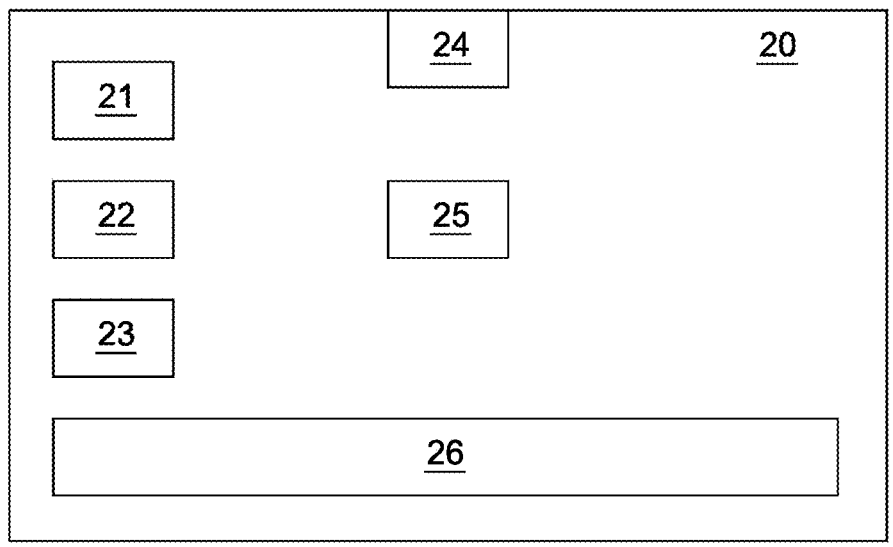
FIG. 2 illustrates schematically a securing device according to an embodiment of the present invention.

Such a securing device 20 may be any electronic device including a processor. For example it may be a personal computer PC on which a development environment was installed. FIG. 2 describes an exemplary embodiment of such a securing device comprising a first processor 21, a first RAM memory 22, a first communication unit 23 such as an Ethernet or Wifi network adapter, a first display 24, first mass storage means 25 such as a hard drive, and first user input means 26. The software code SC to be secured may be stored on the first mass storage means 25 of the securing device. The secure software code SSC, obtained after the securing device 20 applies the method according to the first aspect to the software code SC, can also be stored on the first mass storage 25.

Figure 3:
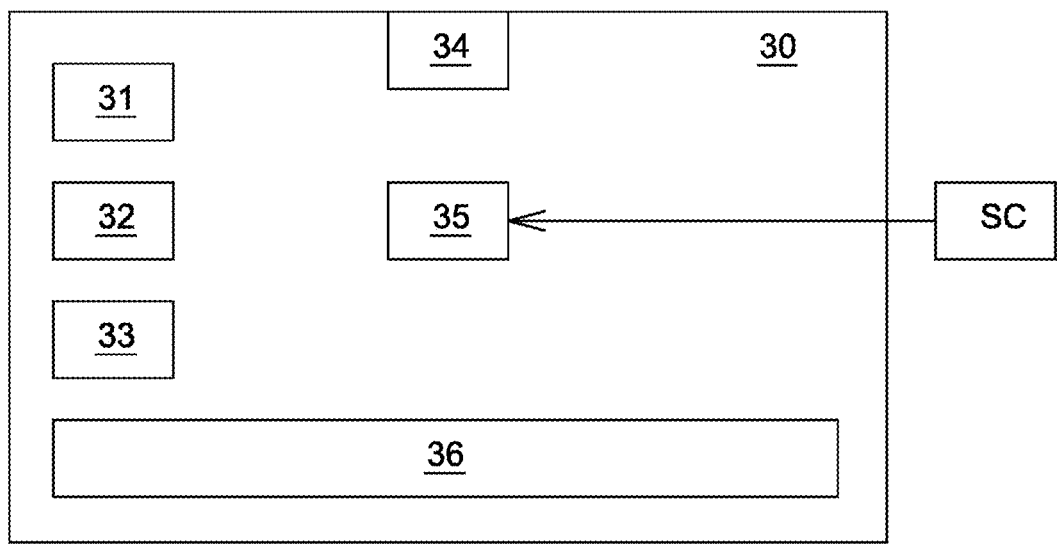
FIG. 3 illustrates schematically an execution device according to an embodiment of the present invention.

FIG. 3 describes an exemplary embodiment of the execution device 30. For example it may be a personal computer PC, a mobile device such as a smartphone or a tablet, or a public terminal in a bank or a point of sale. It may also be a simple chip included in a smart card or a credit card. It may comprise a second processor 31, a second RAM memory 32, a second communication unit 33 such as an Ethernet or Wifi network adapter, a second display 34, second mass storage means 35 such as a hard drive, and second user input means 36. The secure software code SSC, to be executed by the second processor 31 of the execution device 30, may be stored on the second mass storage means 35 of the executing device. The electronic device 30 may be of any type similar or different than the one of the execution device. Both devices may share the same hardware architecture, such as x86, ARM or PowerPC, or have different architectures.

Securing Method Main Steps

Figures 4, 5:
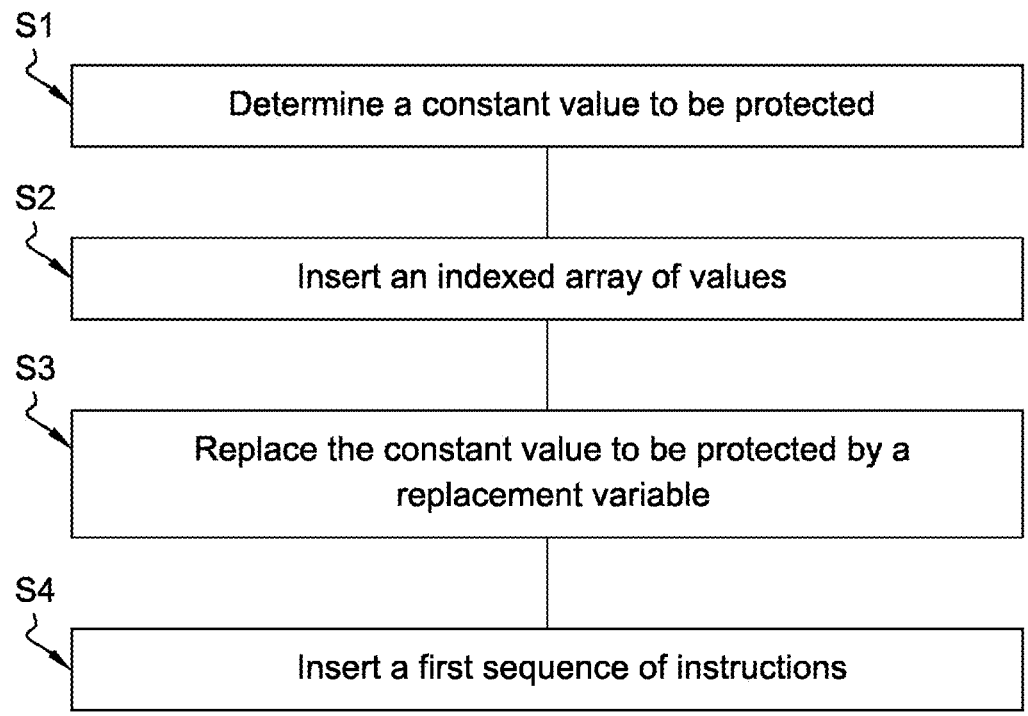
FIG. 4 illustrates schematically a method of securing a software code according to an embodiment of the present invention.
FIG. 5 illustrates an indexed array according to an embodiment of the present invention.

The following paragraphs describe the steps of the method according to the first aspect of the invention, securing the software code SC and producing the secure software code SSC, as depicted on FIG. 4. These steps are performed by the first processor 21 of the securing device 20 and are all labeled with the letter "S" followed by the number of the step.

When needed, reference is made to steps performed by the execution device 30 when executing the secure software code SSC, after the method according to the first aspect is completed. Such execution steps are labeled with the letter "E" followed by the number of the step.

Securing Method Main Steps: First Securing Step

In a first securing step S1, a constant value to be protected is determined in the software code. Such a constant value to be protected may be specified to the first processor 21 by a human operator. Alternatively, it can be determined randomly by the first processor 21 itself or determined by an analysis program run by the first processor 21. By parsing the software code read from the first mass storage means 25, the first processor 21 can spot one or more constant values, for example when a variable is initialized to such a constant value (variable=constant_value), or when a constant value is used as a parameter of an operation such as a comparison (if variable>constant_value then . . . ). Such a constant value may also be a memory address specifying a location in the second RAM memory of the execution device 30 when the instructions of the secure code SC are executed by the execution device 30. Such an address may for example specify the start or end of a section of the memory on which an integrity check is to be performed. In order to protect the software code against reverse engineering and tampering by an attacker, such constant values shall be hidden from the attacker as much as possible and shall not remain "in plain text" in the secure software code SSC produced by the method according to the first aspect.

In the following steps, the aim is to replace in the software code the constant value by a variable, called replacement variable, and insert in the code instructions which, when executed by the second processor 31 of the execution device 30, set the value of this replacement variable equal to the protected constant value based on another value, hereafter called target value X. In order to make things harder for an attacker who would try to retrieve the constant value by a static analysis of the code, the target value X is stored in an array containing multiple values, and instructions are inserted in the modified code which, when executed by the second processor 31 of the execution device 30, compute the index in the array of the target value from which the constant value can be determined.

Securing Method Main Steps: Second Securing Step

More precisely, in a second securing step S2, the first processor 21 of the securing device 20 may insert in the software code an indexed array of values, described in FIG. 5, such that the constant value to be protected can be determined from one value of the array, hereafter called target value X. In the following steps of the method, such an array will enable an indirect determination of the constant value, by reading the target value X in the array.

Securing Method Main Steps: Third Securing Step

In a third securing step S3, the first processor 21 replaces in the software code the constant value to be protected by a replacement variable. It is the value of this replacement variable that the second processor 31 of the execution device 30 will set equal to the constant value based on the target value read in the array, when executing the secure software code SSC.

During this third securing step S3, the first processor may replace one, several, or even all occurrences of the constant value by the same replacement variable. In order to be efficient against an attacker it is better if all occurrences of the constant values are replaced by a variable but it is not mandatory that all occurrences are replaced by the same unique variable. Half occurrences could for example be replaced by a first replacement variable and the other half by a second variable. In a particular embodiment all steps of the method according to the first aspect may be applied separately for each occurrence of the constant value. The secure software code then includes a dedicated array, target value and replacement variable for each occurrence of the constant value.

Securing Method Main Steps: Fourth Securing Step

Figure 6:
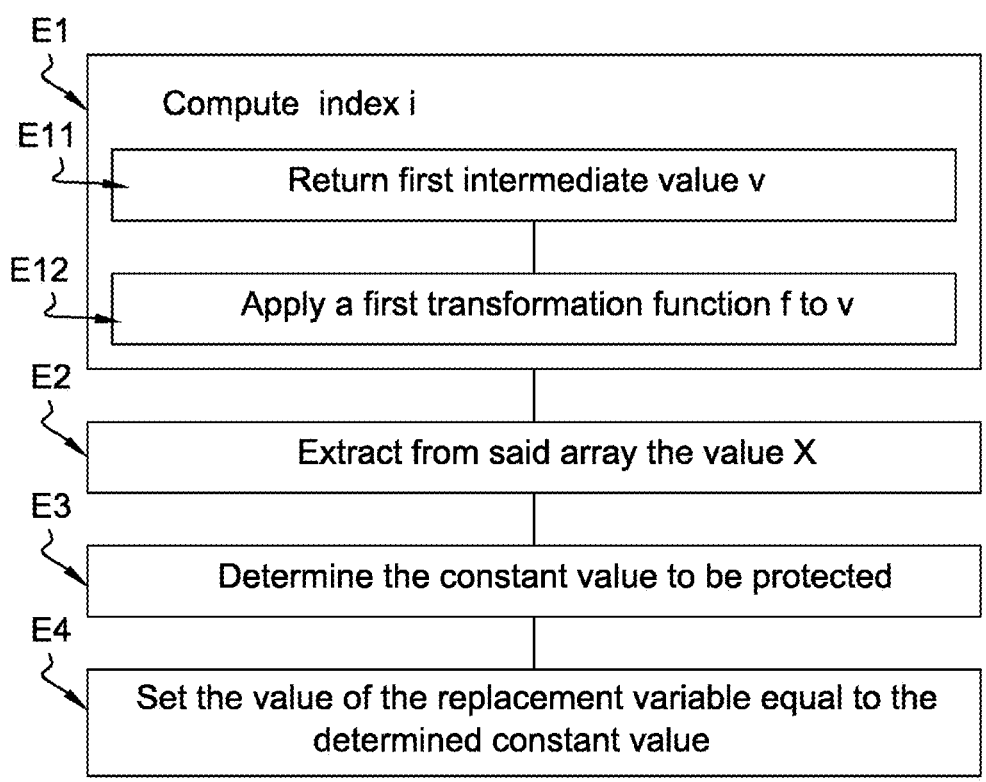
FIG. 6 illustrates schematically a method of executing instruction of a secure software code according to an embodiment of the present invention.

In a fourth securing step S4, the first processor 21 inserts in the software code a first sequence of instructions. This first sequence of instructions is such that when the secure software code SSC comprising this first sequence of instructions is executed by the second processor 31 of the execution device 30, the actions described in execution steps E1 to E4 are performed, these execution steps being described here after and in FIG. 6. This first sequence of instruction aims at enabling the execution device, when executing the secure software code, to retrieve the constant value based on the target value X in the array.

The first sequence of instructions, when executed by the execution device at SSC runtime:
computes the index i in the array of the value X from which the constant value to be protected can be determined,
extracts from said array the value X located at said computed index i in said array,
from said extracted value X, determines the constant value to be protected,
sets the value of said replacement variable equal to the determined constant value.

Securing Method Exemplary Embodiment

The following paragraphs describe an exemplary and non-limiting embodiment of the securing method according to the first aspect of the invention performed by the securing device 20.

As described before, in the first securing step S1, a constant value to be protected is determined in the software code SC.

Then, in the second securing step S2, an indexed array of values is inserted such that the constant value to be protected can be determined from one value of the array, called the target value X.

The first processor 21 may include in the array the target value X at an index i chosen at random.

In a first embodiment, the target value X is simply equal to the corresponding constant value to be protected. In this embodiment, if the constant value to be protected is a memory address, the values in the array, preferably all of them, may be chosen by the first processor 21 among valid memory addresses when the secure software code is executed by the second processor 31. Doing so, an attacker cannot spot the value in the array corresponding to the constant value by analyzing the values in the array and discarding the ones that are not valid memory addresses. More generally, whatever the type of the constant value, the values in the array may be of the same type than the constant value and may be chosen such that the constant value blends in with them.

Then in the third securing step S3, the constant value to be protected is replaced by a replacement variable in the software code.

And then in the fourth securing step S4, the first sequence of instruction is inserted in the software code. This first sequence of instructions, when executed at runtime computes the index i in the array of the target value X. In order to so, the first sequence of instructions may comprise:
a second sequence of instructions which, when executed at runtime, returns a first intermediate value v,
and a third sequence of instructions which, when executed at runtime, applies a first transformation function f to said first intermediate value v to compute said index i, which can be noted $i=f(v)$.

The computation of the first intermediate value v by the second sequence of instructions may be made on purpose more complicated than needed. This enables making harder for an attacker reverse engineering and understanding such a computation. Such a computation is called opaque computation. The second sequence of instructions may be a sequence having another purpose in the software code than just computing the first intermediate value. For example it may be an integrity check needed for another anti-tampering protection. Or it may be a large sequence of various instructions having no other purpose than computing the first intermediate value in a way that is not easily understandable by an attacker, such as a combination of loops (for, while etc. . . . ) or operations on variables whose values are assigned in another part of the software code.

The first transformation function f applied in the third sequence of instructions may be any function outputting values in the range of the index values of the array and outputting the index of the target value X in the array when applied to the first intermediate value v. For example, it may be a masked hash of the first intermediate value or a mask selecting only a few predetermined bits of the first intermediate value in order to output an index value.

The first transformation function f may be selected randomly by the first processor 21 of the securing device 20 among a first set of predetermined transformation functions verifying the relation $i=f(v)$.

When the method according to the first aspect of the invention is applied separately to several occurrences of a constant value, and when the first transformation function is chosen each time randomly among the first set of predetermined transformation functions, each third sequence of instructions may apply a different transformation function.

Then this first sequence of instructions, when executed at runtime, extracts from said array the value X located at said computed index i in said array, then determines the constant value to be protected from said extracted value X and finally sets the value of said replacement variable equal to the determined constant value.

In the first embodiment, the target value is simply equal to the corresponding constant value to be protected. In this embodiment the constant value is obtained when executing the secure software code SSC by simply reading it in the array, at the index i outputted by the first transformation function. In this embodiment, an attacker trying to discover the constant value to be protected could read it in the array but he has no simple way to discover which value in the array is the constant value.

In a second embodiment, the first sequence of instructions includes a fourth sequence of instructions which when executed at runtime determines a second intermediate value m by applying a second transformation function g to said first intermediate value v. It can be noted m=g(v).

In this second embodiment, the first sequence of instructions also includes a fifth sequence of instructions which when executed at runtime determines the constant value to be protected based on the extracted target value X and the second intermediate value m. Such an embodiment makes it even more difficult for an attacker to retrieve the constant value since it is not stored anymore in the secure software code, even inside an array. In order to retrieve the constant value an attacker would have to determine the target value X among all values in the array, retrieve the second intermediate value m, and finally he would need to discover how the constant value is determined based on the target value and the second intermediate value.

As an example, in this second embodiment, the constant value to be protected may be determined when executing the secure software code SSC, after having extracted the target value X from the array and determined said second intermediate value m, by applying a third transformation function h to the extracted target value X and the second intermediate value m. It can be noted constant_value=h(X, m).

The way the first transformation function may be chosen was described above, including a random selection of the first transformation function among a first set of predetermined functions. Similarly, the second transformation function may be randomly selected in a second set of predetermined transformation functions and the third transformation function may be randomly selected in a third set of predetermined transformation functions, said sets including hash and mask functions. It enables using different second and third transformation functions for each constant value or occurrence of constant value protected by the method of the invention and makes it harder for an attacker to reverse engineer the secure software code.

In this second embodiment, if the constant value to be protected is a memory address, it is likely that the target value X from which the constant value can be determined will not be a valid memory address of any object in the second RAM memory 32 of the execution device 30 when the secure software code SSC will be executed by the second processor. In order to keep concealing the target value among all values in the array, other values in the array may be chosen as invalid memory addresses when the secure software code will be executed by the first processor. Doing so, the analysis by an attacker of the validity of the values in the array, considered as memory addresses, will not reveal which value in the array is the target value X.

Secure Software Code Execution

After the steps described here above have been performed by the securing device, producing a secure software code, such a secure software code can be securely executed by the second processor 31 of the execution device 30. When executing the secure software code, the execution device executes the first sequence of instructions:

during a first execution step E1, the second processor 31 computes the index i in the array of the target value X from which the constant value to be protected can be determined.

during a second execution step E2, the second processor 31 extracts from said array the value located at said computed index i in said array, which is the target value X.

during a third execution step E3, the second processor 31 determines the constant value to be protected from said extracted value.

during a fourth execution step E4, the second processor 31 sets the value of said replacement variable equal to the determined constant value.

In an embodiment, the first execution step E1 may comprise:

a first computation step E11 returning a first intermediate value v, a second computation step E12 applying a first transformation function f to said first intermediate value v to compute said index i, which can be noted i=f(v).

In the second embodiment described above, the first sequence of instructions includes determining a second intermediate value m by applying a second transformation function g to said first intermediate value v which may be noted m=g(v). Then, after the second processor 31 of the execution device 30 has extracted the target value X from the array and determined said second intermediate value m, the constant value to be protected is determined by the second processor 31 based on the extracted target value X and the second intermediate value m.

The constant value to be protected may be determined when executing the secure software code SSC, after extracting the target value X from the array and determining said second intermediate value m, by applying a function h to the extracted target value X and the second intermediate value m.

Other Aspects

In a second aspect, the invention also relates to a non-transitory machine-readable storage medium encoded with the instructions of the secure software code obtained after the first processor 21 of the securing device 20 has performed at least the securing steps S1 to S4 of the method according to the first aspect described here above. Said secure software code is then a modified version of the unsecure software code on which said method according to the first aspect has been applied and comprising a constant value to be protected. In the instructions encoded on said storage medium, said constant value to be protected is replaced in the secure code by a replacement variable.

The non-transitory machine-readable storage medium is also encoded with an indexed array of values such that said constant value to be protected can be determined from one value of the array and a first sequence of instructions which, when executed at runtime perform the execution steps E1 to E4 described here above:

computing the index in the array of the value from which said constant value to be protected can be determined, extracting from said array the value located at said computed index in said array, from said extracted value, determining said constant value to be protected, and setting the value of said replacement variable equal to said determined constant value.

In a third aspect, the invention also relates to the method of executing the instructions of the secure software code, as executed by the second processor 31 of the executing device 30. Said secure software code is then a modified version of the unsecure software code on which the method according to the first aspect described here above has been applied and comprising a constant value to be protected. Said constant value to be protected has been replaced in the secure code by a replacement variable and said secure software code also comprises an indexed array of values such that said constant value to be protected can be determined from one value of the array. The method of executing the instruction of the secure software code comprises the execution steps E1 to E4 described here above:

during the first execution step E1, the second processor 31 computes the index i in the array of the target value X from which the constant value to be protected can be determined;

during the second execution step E2, the second processor 31 extracts from said array the value located at said computed index i in said array, which is the target value X;

during the third execution step E3, the second processor 31 determines the constant value to be protected from said extracted value;

during the fourth execution step E4, the second processor 31 sets the value of said replacement variable equal to the determined constant value.

The invention claimed is:

1. A method of securing a software code (SC) comprising at least one constant value, said method generating a secure software code (SSC) and comprising the steps of:

determining (S1) by a processor (21) in the software code a constant value to be protected, inserting (S2) by the processor in the software code an indexed array of values such that the constant value to be protected can be determined from one value of the array (X), replacing (S3) by the processor in the software code the constant value to be protected by a replacement variable, inserting (S4) by the processor in the software code a first sequence of instructions which, when executed at runtime:
  computes (E1) the index (i) in the array of the value (X) from which the constant value to be protected can be determined,
  extracts (E2) from said array the value (X) located at said computed index (i) in said array,
  from said extracted value (X), determines (E3) the constant value to be protected,
  sets (E4) the value of said replacement variable equal to the determined constant value;

wherein the first sequence of instructions comprises a second sequence of instructions which, when executed at runtime, returns a first intermediate value (v), and a third sequence of instructions which, when executed at runtime, applies a first transformation function (f) to said first intermediate value (v) to compute said index (i), and wherein the first transformation function (f) is selected at random in a first set of predetermined transformation functions.

2. The method of claim 1 wherein said value (X) in the array from which the constant value to be protected can be determined is equal to the constant value to be protected.

3. The method of claim 1 wherein the constant value to be protected is a memory address and values in said array are valid memory addresses when the software code is executed by a processor.

4. The method of claim 1 wherein the first sequence of instructions includes:
  a fourth sequence of instructions which, when executed at runtime, determines a second intermediate value (m) by applying a second transformation function (g) to said first intermediate value (v),
  a fifth sequence of instructions which, when executed at runtime, determines the constant value to be protected based on the extracted value (X) and the second intermediate value (m).

5. The method of claim 4 wherein the second transformation function (g) is selected at random in a second set of predetermined transformation functions.

6. The method of claim 4 wherein the constant value to be protected is determined by applying a third transformation function to the extracted value and the second intermediate value.

7. The method of claim 4 wherein a third transformation function (h) is selected at random in a third set of predetermined transformation functions.

8. The method of claim 1 wherein the constant value to be protected is a memory address and values in said array are invalid memory addresses when the software code is executed by a processor.

9. A non-transitory machine-readable storage medium encoded with instructions of a secure software code for execution by a processor (31), wherein:

said secure software code is a modified version of an unsecure software code comprising a constant value to be protected, said constant value to be protected is replaced in the secure code by a replacement variable, the non-transitory machine-readable storage medium is also encoded with:
  an indexed array of values such that said constant value to be protected can be determined from one value (X) of the array,
  a first sequence of instructions which, when executed at runtime:
    computes (E1) the index (i) in the array of the value (X) from which said constant value to be protected can be determined,
    extracts (E2) from said array the value (X) located at said computed index (i) in said array,
    from said extracted value (X), determines (E3) said constant value to be protected,
    sets (E4) the value of said replacement variable equal to said determined constant value,
  said first sequence of instructions comprising a second sequence of instructions which, when executed at runtime, returns a first intermediate value (v), and a third sequence of instructions which, when executed at runtime, applies a first transformation function (f) to said first intermediate value (v) to compute said index (i), said first transformation function (f) being selected at random in a first set of predetermined transformation functions.

10. A method of executing instructions of a secure software code for execution by a processor (31), wherein:

said secure software code is a modified version of an unsecure software code comprising a constant value to be protected, said constant value to be protected is replaced in the secure code by a replacement variable, said secure software code also comprises an indexed array of values such that said constant value to be protected can be determined from one value (X) of the array, said method comprising the steps of:
- computing (E1) the index (i) in the array of the value (X) from which said constant value to be protected can be determined by applying a first transformation function (f) to a first intermediate result (v), said first transformation function (f) being selected at random in a first set of predetermined transformation functions,
- extracting (E2) from said array the value (X) located at said computed index (i) in said array,
- from said extracted value (X), determining (E3) said constant value to be protected,
- setting (E4) the value of said replacement variable equal to said determined constant value.

\* \* \* \* \*